(12) United States Patent
Bonja

(10) Patent No.: US 6,788,872 B2
(45) Date of Patent: Sep. 7, 2004

(54) DEVICE AND METHOD FOR POSITIONING OPTICAL FIBERS

(75) Inventor: Jeffrey A. Bonja, Sturbridge, MA (US)

(73) Assignee: Molex Incorporated, Lisle, IL (US)

( * ) Notice: Subject to any disclaimer, the term of this patent is extended or adjusted under 35 U.S.C. 154(b) by 17 days.

(21) Appl. No.: 10/115,541

(22) Filed: Apr. 3, 2002

(65) Prior Publication Data

US 2002/0172490 A1 Nov. 21, 2002

Related U.S. Application Data

(60) Provisional application No. 60/281,279, filed on Apr. 3, 2001.

(51) Int. Cl.$^7$ .............................. G02B 6/36; G02B 6/00
(52) U.S. Cl. ....................................... 385/137; 385/136
(58) Field of Search ................................. 385/136, 137

(56) References Cited

U.S. PATENT DOCUMENTS

| | | | |
|---|---|---|---|
| 4,927,229 A | 5/1990 | Tanaka et al. ................ | 385/70 |
| 4,955,976 A | 9/1990 | Freeman et al. .............. | 385/55 |
| 5,090,927 A | 2/1992 | McAnany .................... | 439/892 |
| 5,345,529 A | 9/1994 | Sizer, II et al. ............. | 385/147 |
| 2002/0191944 A1 * | 12/2002 | Moore ........................ | 385/137 |
| 2002/0197047 A1 * | 12/2002 | Basavanhally .............. | 385/137 |

FOREIGN PATENT DOCUMENTS

JP          63-240509     * 10/1988     ................. 385/137

* cited by examiner

*Primary Examiner*—David V. Bruce
*Assistant Examiner*—Krystyna Suchecki
(74) *Attorney, Agent, or Firm*—Romi N. Bose

(57) ABSTRACT

A system for positioning at least one optical fiber. The system includes a plate having a major surface defining a hole adapted to receive an optical fiber. A spring is located on the plate and is located at least partially within the hole to position the optical fiber therein and/or additional plates are used to position the optical fiber.

9 Claims, 3 Drawing Sheets

DEVICE AND METHOD FOR POSITIONING OPTICAL FIBERS

CROSS-REFERENCE TO RELATED APPLICATION

This application claims benefit of U.S. Provisional Patent Application No. 60/281,279, filed Apr. 3, 2001, entitled "Device and Method for Positioning Optical Fibers" which is hereby incorporated by reference herein as if fully set forth.

BACKGROUND

The present invention is directed to the positioning of optical fibers and, more specifically, is directed to at least one plate capable of receiving at least one optical fiber therein.

Fiber optic technology is widely utilized in today's telecommunication and computer networks. One important aspect of fiber optic technology is the interconnection of optical fibers to optoelectronic devices, such as semiconductor lasers, photo-detectors, etc., wherein the optoelectronic devices either receive light signals from the optical fibers or the optoelectronic devices emit light signals into the fibers. A good optical interconnect between optical fibers and optoelectronic devices requires precise alignment of optical fibers, ease of manufacture and a commercially viable manufacturing cost.

The demand for increased data transmission speed and the increase in computer processing speeds have driven the development of fiber optic technology. To achieve the necessary high density, rapid data transmission signals, optical interconnect assemblies are used in various communication and computer networks. Precise positioning of the ends of the fibers must be obtained to properly align the fibers with opto-electronic emitters and/or detectors.

Clearly, it would be advantageous to increase the efficiency with which optical fibers can be positioned. It would also be preferable, but not necessary, to provide a system for positioning optical fibers that could support the optical fibers in a predetermined orientation relative to an opto-electronic emitter and/or detector. It would also be preferable, but not necessary, to provide a system for aligning optical fibers so that a central longitudinal axis of each optical fiber is aligned with a center of a target location regardless of tolerance errors in the diameter of the individual optical fibers.

SUMMARY

One embodiment of the present invention is directed to a system for positioning at least one optical fiber. The system includes a plate having a major surface defining a hole adapted to receive an optical fiber. A spring is located on the plate and is positioned at least partially within the hole. The spring is adapted to secure the optical fiber in the plate when an end of the optical fiber is inserted into the hole.

In another aspect, the present invention is directed to a system for positioning at least one optical fiber. The system includes a plate having a major surface defining a hole adapted to receive an optical fiber. The plate has at least one cutout spaced from a perimeter of the hole forming at least one bendable portion along part of the perimeter. The at least one bendable portion is adapted to flex generally away from a center of the hole to create an interference fit between the optical fiber and the plate when an end of the optical fiber is inserted into the hole.

In another aspect, the present invention is directed to a system for positioning at least one optical fiber. The system includes a first plate having a first major surface defining a hole adapted to receive an optical fiber. A second plate has a second major surface defining a second hole adapted to receive an optical fiber. The second plate is in a stacked orientation relative to the first plate. The first and second plates are slidably positioned relative to each other between a first position and a second position. When the first and second plates are in the first position the hole and the second hole are aligned such that the optical fiber is slidable therethrough. When the first and second plates are in the second position the hole and second hole are positioned to form an interference fit between the optical fiber and the first and second plates.

BRIEF DESCRIPTION OF THE OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Figure 1:
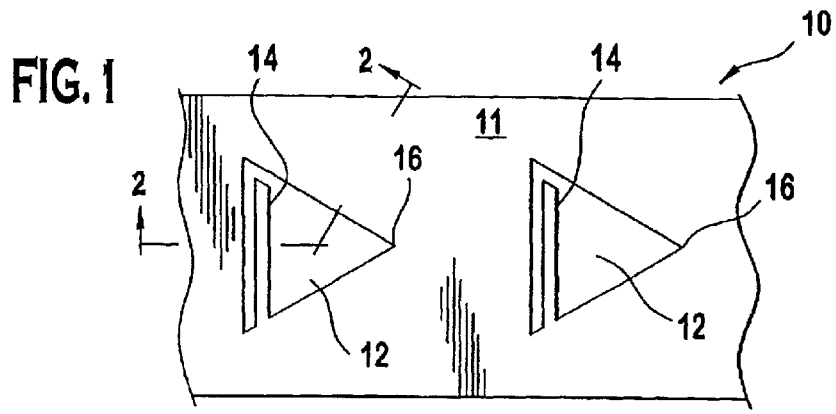
FIG. 1 is a top plan view of a first preferred embodiment of a plate for receiving at least one optical fiber according to the present invention.

Certain terminology is used in the following description for convenience only and is not limiting. The words "right,"

"left," "lower," and "upper" designate directions in the drawings to which reference is made. The words "inwardly" and "outwardly" refer to directions toward and away from, respectively, the geometric center of the at least one plate and designated parts thereof. The terminology includes the words above specifically mentioned, derivatives thereof, and words of similar import. Additionally, the words "a" and "one," as used in the claims and in the corresponding portions of the specification, are defined as meaning "at least one" unless specifically stated otherwise.

Figure 2:
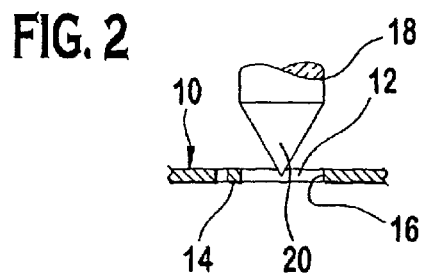
FIG. 2 is a cross-sectional view of the plate of FIG. 1 as taken along the line 2—2 of FIG. 1 illustrating an optical fiber prior to engagement with the plate.
Figure 3:
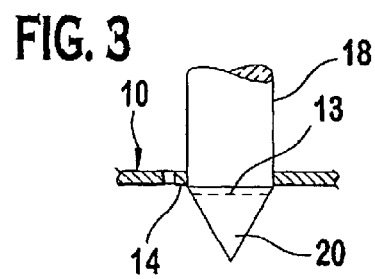
FIG. 3 is a cross-sectional view of the plate of FIG. 1, similar to that of FIG. 2, illustrating the optical fiber secured in a hole in the plate of FIG. 2.
Figure 4:
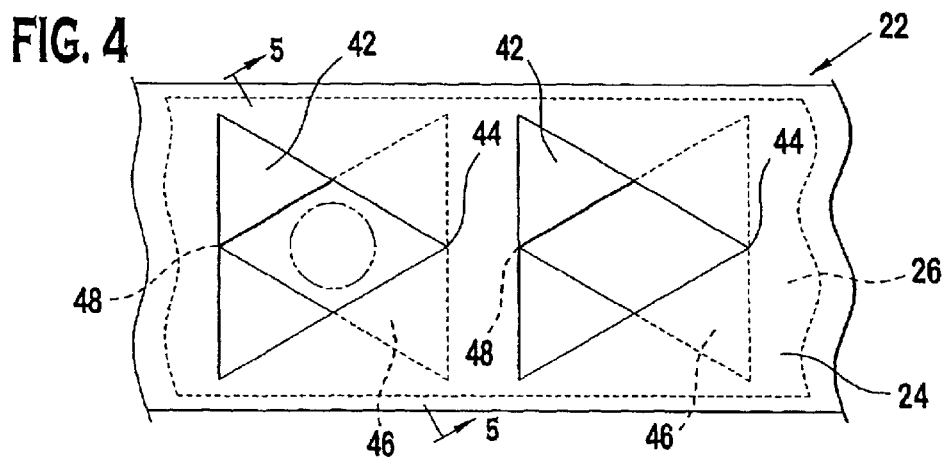
FIG. 4 is a top plan view of a first preferred embodiment of stacked plates for receiving at least one optical fiber according to the present invention.
Figure 5:
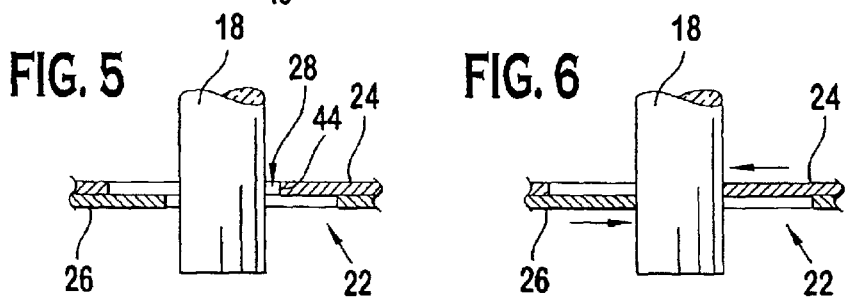
FIG. 5 is a cross-sectional view of the stacked plates of FIG. 4 as taken along the line 5—5 in FIG. 4 illustrating a top and bottom plate aligned to form a passageway through which the optical fiber extends.
Figure 6:
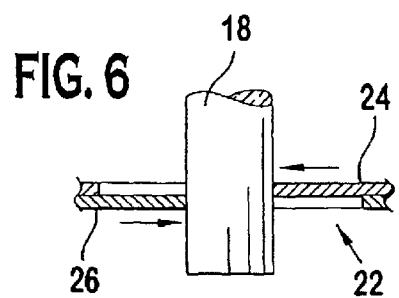
FIG. 6 is a cross-sectional view of the stacked plates of FIG. 4, similar to that of FIG. 5, illustrating the top and bottom plates aligned to abut the lateral sides of the optical fiber.
Figure 7:
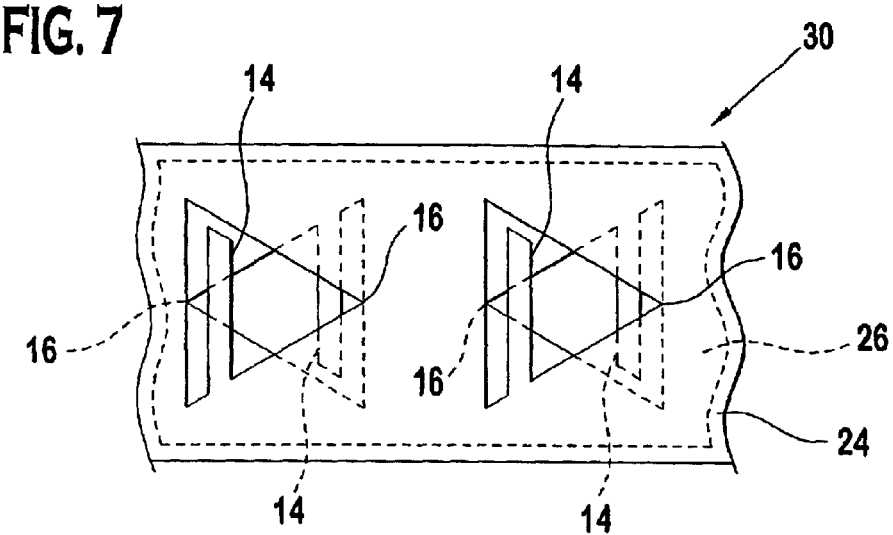
FIG. 7 is a top plan view of a second preferred embodiment of stacked plates for engaging at least one optical fiber according to the present invention.
Figure 8A:
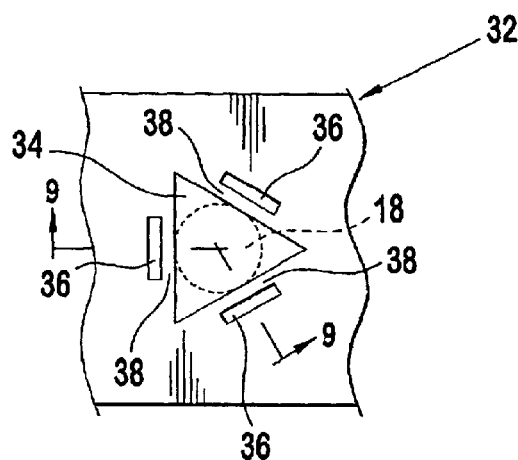
FIG. 8A is a top plan view of a second preferred embodiment of a plate for engaging at least one optical fiber according to the present invention.
Figure 9:
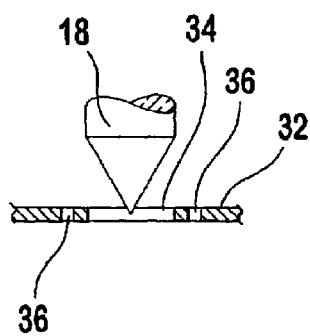
FIG. 9 is a cross-sectional view of the plate of FIG. 8A as taken along the line 9—9 of FIG. 8A illustrating the plate prior to insertion of an optical fiber.
Figure 10:
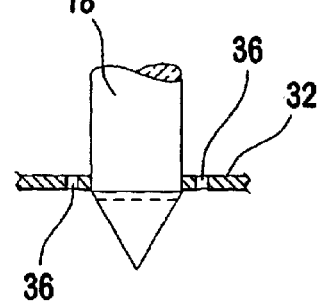
FIG. 10 is a cross-sectional view of the plate of FIG. 8A, similar to that of FIG. 9, illustrating the optical fiber engaged with the plate.
Figure 8B:
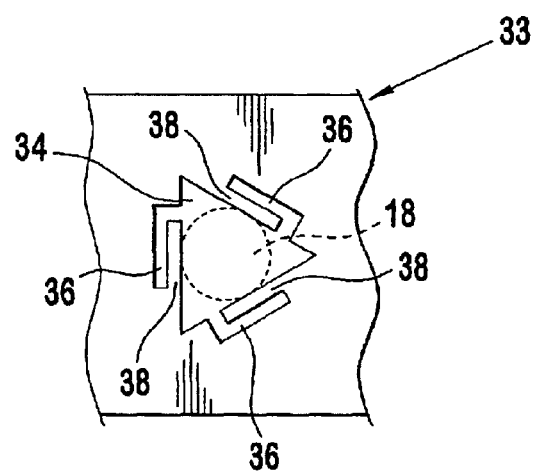
FIG. 8B is a top plan view of a third preferred embodiment of a plate for engaging at least one optical fiber according to the present invention.
Figure 11:
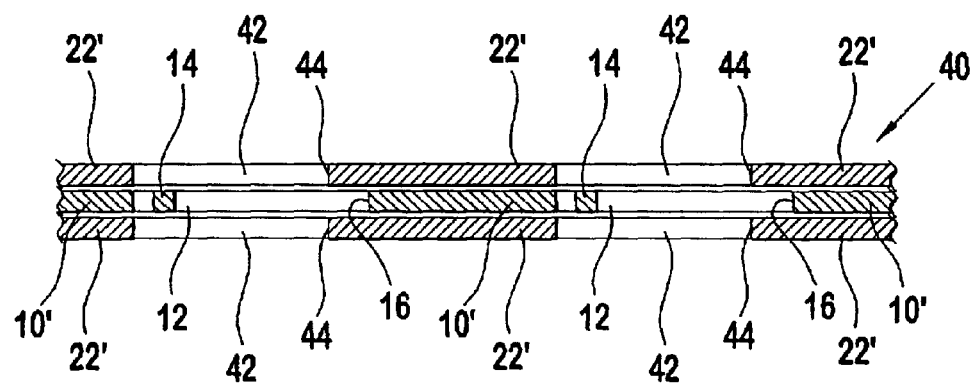
FIG. 11 is a cross-sectional view of a third preferred embodiment of stacked plates for receiving at least one optical fiber according to the present invention.

Referring to the drawings in detail, wherein like numerals indicate like elements throughout, there is shown in FIGS. 1–3 a first preferred embodiment of a plate for receiving at least one optical fiber 18, generally designated 10. FIGS. 4–6 illustrate a first preferred embodiment of stacked plates for receiving at least one optical fiber 18, generally designated 22. FIG. 7 illustrates a second preferred embodiment of stacked plates for receiving at least one optical fiber 18, generally designated 30. FIGS. 8A, 9 and 10 illustrate a second preferred embodiment of a plate for receiving at least one optical fiber 18, generally designated 32. FIG. 8B illustrates a third preferred embodiment of a plate for receiving at least one optical fiber 18, generally designated 33. FIG. 11 illustrates a third preferred embodiment of stacked plates for receiving at least one optical fiber 18, generally designated 40.

It is preferred that the plates of the present invention are formed of a material suitable for use in optical fiber applications, such as silicone or the like. Those of ordinary skill in the art will appreciate from this disclosure that any other known materials suitable for use with optical fibers 18 can be used to form the plates of the present invention without departing from the scope of this invention. Additionally, the plates can be formed by a combination, or layers, of materials without departing from the scope of the present invention.

Referring to FIGS. 1–3, the first preferred embodiment of a plate 10 (hereinafter referred to as the "first preferred plate 10") for receiving at least one optical fiber 18 includes at least one hole 12 adapted to receive an optical fiber 18. The hole 12 preferably has a generally triangular shape. However, those of ordinary skill in the art will appreciate from this disclosure that holes 12 having different shapes may be used without departing from the scope of the present invention. For example, the holes 12 may be parabolic, oblong, diamond-shaped or the like without departing from the scope of the present invention. While the first preferred plate 10 is shown as having two holes 12, those of ordinary skill in the art will appreciate from this disclosure that the first preferred plate 10 can have one, three or more holes 12 without departing from the scope of the present invention. Additionally the holes 12 can be arranged on the first preferred plate 10 linearly, in an irregular pattern, along a two dimensional grid or the like. Thus, an array of fibers can be positioned in the first preferred plate 10 by forming holes 12 in locations depending on the particular application for which the fiber array will be used.

A spring 14 is preferably located on the plate and positioned at least partially within the hole 12. The spring 14 has a first end disposed proximate to a perimeter of the hole 12 and has a second end disposed at least partially in the hole 12. The first end of the spring 14 is generally fixed relative to the plate 14. Those of ordinary skill in the art will appreciate from this disclosure that the first end of the spring 14 can flex while still being generally fixed in position relative to the plate 10. The spring 14 is adapted to secure the optical fiber 18 in the plate 10 when an end 20 of the optical fiber 18 is inserted into the hole 12. It is preferred that the spring 14 is generally within the same plane as the first preferred plate 10.

The spring 14 biases an optical fiber 18 into a desired position (as shown in FIG. 3) in the first preferred plate 10 as follows. The spring 14 is moveable from an initial position (shown in FIG. 2), in which a distance between the spring 14 and a portion of the hole 12 is less than a diameter of the optical fiber 18, to a displaced position (shown in FIG. 3), in which the distance is generally equal to the diameter of the optical fiber 18. The spring(s) 14 preferably extend generally upwardly (as viewed in FIG. 1) parallel to the left side of the corresponding triangular shaped hole 12 and is adapted to push the optical fiber 18 toward an apex 16 of the hole 12. The springs 14 and the body 11 of the first preferred plate 10 are preferably, but not necessarily, formed as one piece.

A preferably tapered optical fiber 18 is inserted into the hole 12 by aligning a tip 20 of the optical fiber 18 with the hole 12. The diameter of the optical fiber 18 should be greater than the distance between the spring 14 and the most distant apex 16 of the hole 12. This causes the spring 14 to be deflected leftwardly when the optical fiber 18 is inserted into the hole 12 creating an interference fit between the optical fiber 18 and the first preferred plate 10. Once the optical fiber 18 is engaged with the first preferred plate 10, the tip 20 may be removed from the optical fiber 18 by cutting the optical fiber at a location generally corresponding to line 13. The springs 14 in the first preferred plate 10 allow the optical fibers 18 to be properly aligned proximate the apex 16 of the holes 12 with greater accuracy. This facilitates the proper positioning of an array of optical fibers.

Referring to FIGS. 8A, 9 and 10, the second preferred embodiment of a plate 32 (hereinafter referred to as the "the second preferred plate 32") for receiving at least one optical fiber includes at least one hole 34. As discussed in connection with the first preferred plate 10, the second preferred plate 32 can have one or more holes of differing size, shapes and positioning along the second preferred plate 32 without departing from the scope of the present invention.

The plate 32 preferably has at least one cutout 36 spaced from a perimeter of the hole 34 forming at least one bendable portion 38 along part of the perimeter. The at least one bendable portion 38 is adapted to flex generally away from a center of the hole 34 to create an interference fit between the optical fiber 18 and the plate 32 when an end of the optical fiber 18 is inserted into the hole 34. It is preferable that the at least one bendable portion 38 is adapted to flex generally within a plane parallel to the major surface and away from a center of the hole 34.

The cutouts 36 in the plate body 11 allow the sides of the hole 34 to flex to form an interference fit with the optical fiber 18. It is preferable that a separate cutout 36 be positioned proximate to and spaced from each side of the hole 34 to form bendable portions 38 in the plate body 11. The bendable portions 38 are the general functional equivalents of leaf springs and secure the optical fiber 18 within the hole 34. The bendable portion(s) 38 is moveable from an initial position (shown in FIG. 9), in which a size of the hole 34 is insufficient to allow the optical fiber 18 to be inserted therein, to a second position (shown in FIG. 10), in which the size of the hole 34 is sufficient to allow the optical fiber 18 to be inserted therein. The second preferred plate 32 has the advantage of centrally aligning an optical fiber longitudinal axis at a given point along the second preferred plate 32 regardless of the tolerance errors in the sizing of the optical fiber 18. This further increases the accuracy of optical fiber placement achieved by the second preferred plate.

The optical fiber 18 used with the second preferred plate 32 preferably has a diameter generally greater than the plate hole 34 to facilitate an interference fit between the optical fiber 18 and the sides of the hole 34. Those of ordinary skill in the art will appreciate from this disclosure that multiple cutouts 36 may be positioned along one side of the hole 34 without departing from the scope of the present invention. It is preferred that the hole 34 has a generally triangular shape with one bendable portion 38 along each side.

Referring to FIG. 8B, the third preferred embodiment of a plate 33 (hereinafter referred to as the "third preferred plate 33") for receiving at least one optical fiber preferably includes at least one L-shaped cutout 36 that connects to the hole 34 so that bendable portions 38, or spring, are supported on one end only. A second and/or third spring 38 are preferably positioned on the plate 33 and located at least partially in the hole 34. The first, second, and third springs are preferably adapted to align the longitudinal axis of the optical fiber 18 with the center of the hole 34. This increases the amount of flexibility in the bendable portions 38 while maintaining the accurate positioning of the optical fiber 18.

A second plate can be positioned over the plate 33 that has the same configuration (although possibly a different orientation) as the plate 33. The plate 33, in combination with the second plate, are adapted to maintain the optical fiber 18 in a perpendicular orientation relative to a major surface of the plate and/or the second plate. Accordingly, those of ordinary skill in the art will appreciate from this disclosure that multiple second preferred plates 32 and/or third preferred plates 33 can be stacked to receive at least one optical fiber 18. The stacking of multiple second preferred plates 32 and/or third preferred plates 33 provides a device for receiving at least one optical fiber 18 that automatically positions the longitudinal axis of an optical fiber 18 at a predetermined plate position regardless of tolerance errors in the sizing of the optical fiber 18 and encourages the optical fiber 18 to be aligned perpendicular to the stacked plates.

Referring to FIGS. 4–6, a first preferred embodiment of stacked plates 22 (hereinafter referred to as the "first preferred stack 22") has top and bottom plates 24, 26 (or first and second plates). The second, or bottom, plate 26 has a second major surface defining a second hole (shown in phantom lines) adapted to receive an optical fiber 18. The second plate 26 is preferably in a stacked orientation relative to the first, or top, plate 24. The first and second plates are preferably slidably positioned relative to each other between a first position (shown in FIG. 5) and a second position (shown in FIG. 6). When the first and second plates 24, 26 are in the first position their holes are aligned such that the optical fiber 18 is slidable therethrough. When the first and second plates are in the second position the hole and second hole are positioned to form an interference fit between the optical fiber 18 and the first and second plates 24, 26.

The top plate 24 preferably has at least one generally triangular shaped hole 42 with a rightwardly extending apex 44 (as viewed in FIG. 4). The bottom plate 26 preferably has at least one triangular shaped hole 46 with a leftwardly extending apex 48 (as viewed in FIG. 4). It is preferable that the plates 24, 26 are positioned to form a passageway 28 through the first preferred stack 22.

As best shown in FIG. 5, once the passageway 28 through the preferred stack 22 is large enough, an optical fiber 18 is inserted therethrough. Then, one of the plates 24, 26 is moved (either leftwardly or rightwardly as viewed in FIG. 5) causing the distance between the apex 44 of the top plate 24 and the apex 48 of the bottom plate 26 to decrease until the optical fiber 18 is abutingly secured between the two plates 24, 26. While it is preferred that the holes 42, 46 in the top and bottom plates 24, 26 have a generally triangular shape, those of ordinary skill in the art will appreciate that various sizes, shapes and positions can be used (as described above in connection with the first preferred plate 10) while still securing the optical fiber 18 in a predetermined position.

Referring to FIG. 7, the second preferred embodiment of stacked plates 30 (hereinafter referred to as the "second preferred stack 30") preferably includes plates having holes with springs 14 extending therein in a fashion similar to that described above in connection with the first preferred plate 10. That is, a bottom plate 10 (shown in phantom lines) is positioned underneath or over the plate 10 shown in FIG. 1. The bottom plate 10 has a second hole 12 (shown in phantom lines) adapted to receive the optical fiber and a second spring 14 (shown in phantom lines) located thereon and positioned at least partially within the second hole. The plate 10 and the bottom plate 10 are slidably positioned relative to each other.

When the system for positioning at least one optical fiber 18 includes multiple plates (similar to the first preferred plate 10), it is preferred that the plates are aligned with apexes oppositely located (as shown in FIG. 7). This allows the plates 24, 26 of the second preferred stack 30 to be aligned so that the plate hole apexes that will contact a single optical fiber can be drawn together. As the apexes 16 are drawn together to brace the optical fiber 18 therebetween, springs 14 press the optical fiber 18 against the opposing apex 16. The hole 12 and the second hole 12 (shown in phantom lines) are preferably configured such that the spring 14 and second spring 14 (shown in phantom lines) are adapted to engage opposing sides of the optical fiber 18.

Referring to FIG. 11, the third preferred embodiment of stacked plates 40 (hereinafter referred to as the "third preferred stack 40") preferably includes at least three plates to secure at least one optical fiber 18 therein. Those of ordinary skill in the art will appreciate from this disclosure that more than three plates can be used to form the third preferred stack 40 without departing from the scope of the present invention.

A top plate 22' is preferably positioned over the plate 10' and has a second hole 42. A bottom plate 22' is preferably positioned under the plate 10' and has a third hole 42. The second and third holes 42 are generally vertically aligned with the plate 10' slidably disposed between the top and bottom plates 22'.

It is preferred, but not necessary, that the top and bottom plates 22' of the third preferred stack 40 have a generally triangular shape and/or are formed using plates that are similar to the top plate 24 of the first preferred stack 22 (shown in FIG. 4). The middle plate 10' of the third preferred stack 40 is preferably similar to the first preferred plate 10 (shown in FIG. 1). Those of ordinary skill in the art will appreciate that the specific stacked position (i.e., order in which the plates are placed on top of each other) of the individual plates 10', 22' of the third preferred stack 40 can be varied without departing from the scope of the present invention.

It is preferred that the top and bottom plates 22' of the third preferred stack 40 have holes 42 with a generally rightwardly facing apex 44. It is preferred that the middle plate 10' also have a generally triangular shaped hole 12 with a generally rightwardly facing apex 16. The size of the holes 12, 42 can vary from plate to plate (or within a single plate) without departing from the scope of the present invention.

It is preferred, but not necessary, that top and bottom plates 22' are fixed in position with middle plate 10' being slidable therebetween. When inserting an optical fiber 18, the middle plate 10' is preferably moved leftwardly to move the spring 14 out of the projected area of the holes 42 in the top and bottom plates 22' as much as possible. Once the optical fiber 18 is inserted through the third preferred stack 40, the middle plate 10' is slid rightwardly causing the springs 14 to engage the optical fiber 18 and bias the optical fiber 18 into the apex 44 of the holes 42 in the top and bottom plates 22'.

The third preferred stack 40 provides superior accuracy in the positioning of optical fibers 18 by allowing multiple optical fibers 18 to be positioned in an array at predetermined locations proximate to the apexes 44 of the top and bottom plates 22'. Additionally, by using three or more plates 10', 22' to the secure the optical fibers 18, the optical fibers 18 are positioned in a generally perpendicular fashion relative to the third preferred stack 40. Furthermore, the use of springs 14 to bias each of the optical fibers 18 in position allows the third preferred stack 40 to separately compensate for tolerance errors in individual optical fibers 18. For example, if one optical fiber 18 has a larger than specified diameter, then the appropriate spring 14 will deflect to a greater extent to allow the plates 10', 22' to be moved into the desired position and to firmly secure optical fibers 18 having a smaller diameter.

It is recognized by those skilled in the art, that changes may be made to the above-described embodiments of the invention without departing from the broad inventive concept thereof. For example, those of ordinary skill in the art will appreciate from this disclosure that various plate stacks for receiving at least one optical fiber can be formed using any combination or number of plates disclosed herein without departing from the scope of the present invention. It is understood, therefore, that this invention is not limited to the particular embodiments disclosed, but is intended to cover all modifications which are within the spirit and scope of the invention as defined by the appended claims.

What is claimed is:

1. A system for positioning at least one optical fiber, the system comprising: a plate having a major surface defining a hole adapted to receive an optical fiber; a spring located on the plate and positioned at least partially within the hole, the spring being adapted to secure the optical fiber in the plate when an end of the optical fiber is inserted into the hole; a second spring positioned on the plate and located at least partially in the hole; a third spring positioned on the plate and located at least partially in the hole, wherein the first, second, and third spring are adapted to alien a longitudinal axis of the optical fiber with a center of the hole; and a second plate positioned over the elate and having the same configuration, the plate in combination with the second plate, being adapted to maintain the optical fiber in a perpendicular orientation relative to the major surface.

2. The system of claim 1, wherein the spring is moveable from an initial position, in which a distance between the spring and a portion of the hole is less than a diameter of the optical fiber, to a displaced position, in which the distance is generally equal to the diameter of the optical fiber.

3. The system of claim 1, wherein the spring has a first end disposed proximate to a perimeter of the hole and has a second end disposed at least partially in the hole, the first end of the spring being generally fixed relative to the plate.

4. The system of claim 3, wherein the hole has a generally triangular shape.

5. The system of claim 4, wherein the spring is oriented in a direction generally parallel to a side of the hole and is adapted to push the optical fiber toward an apex of the hole.

6. A system for positioning at least one optical fiber, the system comprising: a plate having a major surface defining a hole adapted to receive an optical fiber; and a spring located on the plate and positioned at least partially within the hole, the spring being adapted to secure the optical fiber in the plate when an end of the optical fiber is inserted into the hole, wherein the spring is moveable from an initial position, in which a distance between the spring and a portion of the hole is less than a diameter of the optical fiber, to a displaced position, in which the distance is generally equal to the diameter of the optical fiber; a top plate positioned over the plate and having a second hole; and a bottom plate positioned under the plate and having a third hole, the second and third holes being generally vertically aligned, wherein the plate is slidably disposed between the top and bottom plates.

7. The system of claim 6, wherein the second and third holes each have a generally triangular shape.

8. A system for positioning at least one optical fiber, the system comprising: a plate having a major surface defining a hole adapted to receive an optical fiber; and a spring located on the plate and positioned at least partially within the hole, the spring being adapted to secure the optical fiber in the plate when an end of the optical fiber is inserted into the hole; and a bottom plate positioned underneath the plate, the bottom plate having a second hole adapted to receive the optical fiber and a second spring located thereon and positioned at least partially within the second hole, the plate and the bottom plate being slidably positioned relative to each other.

9. The system of claim 8, wherein the hole and the second hole are configured such that the spring and second spring are adapted to engage opposing sides of the optical fiber.

* * * * *